(12) United States Patent
Graff et al.

(10) Patent No.: US 10,760,324 B2
(45) Date of Patent: Sep. 1, 2020

(54) MASONRY ANCHOR

(71) Applicant: Schlage Lock Company LLC, Carmel, IN (US)

(72) Inventors: Lance W. Graff, Villa Hills, KY (US); Matthew J. Stouder, Blue Ash, OH (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 16/244,505

(22) Filed: Jan. 10, 2019

(65) Prior Publication Data
US 2020/0224485 A1 Jul. 16, 2020

(51) Int. Cl.
*E06B 1/60* (2006.01)
*F16B 37/04* (2006.01)
*F16B 13/08* (2006.01)

(52) U.S. Cl.
CPC ............ *E06B 1/6023* (2013.01); *F16B 13/08* (2013.01); *F16B 37/045* (2013.01)

(58) Field of Classification Search
CPC ...... E06B 1/6023; E06B 1/6038; F16B 13/08; F16B 37/045
See application file for complete search history.

(56) References Cited

U.S. PATENT DOCUMENTS

| | | | |
|---|---|---|---|
| 2,250,072 A * | 7/1941 | Tinnerman | F16B 5/10 411/549 |
| 2,676,680 A | 4/1954 | Kindorf | |
| 3,721,055 A * | 3/1973 | Jerchower | E06B 1/12 52/217 |
| 4,442,644 A | 4/1984 | Jukes | |
| 4,784,552 A | 11/1988 | Rebentisch | |
| 4,790,701 A * | 12/1988 | Baubles | F16B 37/044 411/107 |
| 4,873,804 A | 10/1989 | Kukke | |
| 5,022,804 A * | 6/1991 | Peterson | F16B 37/044 403/21 |
| 5,060,436 A * | 10/1991 | Delgado, Jr. | B28B 23/005 52/295 |
| 5,347,777 A * | 9/1994 | Sudduth | E04C 5/122 52/223.13 |
| 5,669,198 A | 9/1997 | Ruff | |
| 5,743,062 A | 4/1998 | Fricker | |

(Continued)

FOREIGN PATENT DOCUMENTS

WO 2014044804 A1 3/2014

*Primary Examiner* — Rodney Mintz
(74) *Attorney, Agent, or Firm* — Taft Stettinius & Hollister LLP

(57) ABSTRACT

An exemplary masonry anchor includes a plate and a tube extending from the plate. The plate has a first end, an opposite second end, and a pair of edges extending between the first and second end. The tube is defined by a circumferential sidewall surrounding a central opening of the tube. The tube has a first end portion secured to the plate and an opposite second end portion. In certain embodiments, the first and second ends of the plate are curved. In certain embodiments, the second end portion of the tube includes a cutout operable to receive a dimple of a channel member. In certain embodiments, one or both of the edges of the plate are bent in the direction in which the tube extends from the plate.

20 Claims, 4 Drawing Sheets

(56) References Cited

U.S. PATENT DOCUMENTS

| | | | |
|---|---|---|---|
| 6,240,697 B1* | 6/2001 | Thompson | E04B 1/4121 52/698 |
| 6,431,517 B1* | 8/2002 | Chapman | E04B 1/4157 249/91 |
| 7,225,589 B1* | 6/2007 | Smith | E02D 27/02 52/292 |
| 7,487,597 B2* | 2/2009 | Diaz | E04B 1/4157 33/562 |
| 7,797,883 B2 | 9/2010 | Tarbell et al. | |
| 7,891,110 B2* | 2/2011 | Diaz | E04G 21/185 33/562 |
| 8,136,260 B1* | 3/2012 | Jones | G01B 5/24 33/518 |
| 8,381,482 B2* | 2/2013 | Lin | E04B 1/4157 52/295 |
| 8,516,763 B2* | 8/2013 | Hohmann, Jr. | E04B 1/4178 52/383 |
| 8,544,814 B2* | 10/2013 | Diaz | E04B 1/4157 249/207 |
| 9,083,169 B2* | 7/2015 | James | H02G 3/32 |
| 9,091,090 B1 | 7/2015 | Kirby | |
| 10,465,432 B1* | 11/2019 | Brannon | E06B 1/6076 |
| 2001/0036391 A1* | 11/2001 | Kaibach | F16B 13/08 411/57.1 |
| 2002/0078657 A1 | 6/2002 | Zambelli et al. | |
| 2004/0155161 A1 | 8/2004 | Yeh | |
| 2006/0016140 A1* | 1/2006 | Smith | E02D 27/02 52/295 |
| 2007/0062019 A1* | 3/2007 | Imparato | F16B 9/02 29/458 |
| 2008/0075556 A1* | 3/2008 | Smith | E06B 1/6076 411/379 |
| 2011/0041450 A1* | 2/2011 | Espinosa | E04B 1/2604 52/698 |
| 2012/0308330 A1* | 12/2012 | Hohmann, Jr. | E04B 1/4178 411/387.1 |
| 2012/0311944 A1* | 12/2012 | Stier | E06B 1/6023 52/213 |
| 2013/0189050 A1* | 7/2013 | James | H02G 3/32 411/166 |
| 2013/0340366 A1* | 12/2013 | Gray | E04B 1/26 52/223.14 |
| 2015/0197940 A1 | 7/2015 | Bilge | |
| 2017/0074305 A1* | 3/2017 | Nijdam | F16B 37/045 |
| 2019/0352900 A1* | 11/2019 | Espinosa | E04C 5/16 |
| 2019/0368188 A1* | 12/2019 | Adachi | E04B 1/58 |
| 2019/0382996 A1* | 12/2019 | Adachi | E04B 1/58 |

* cited by examiner

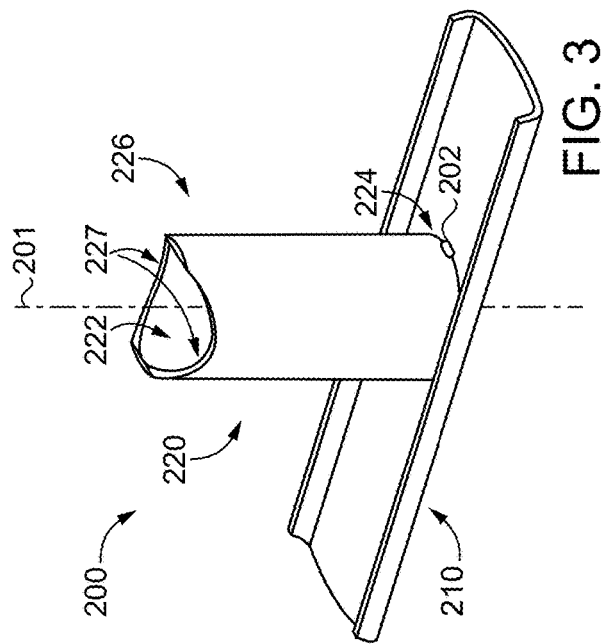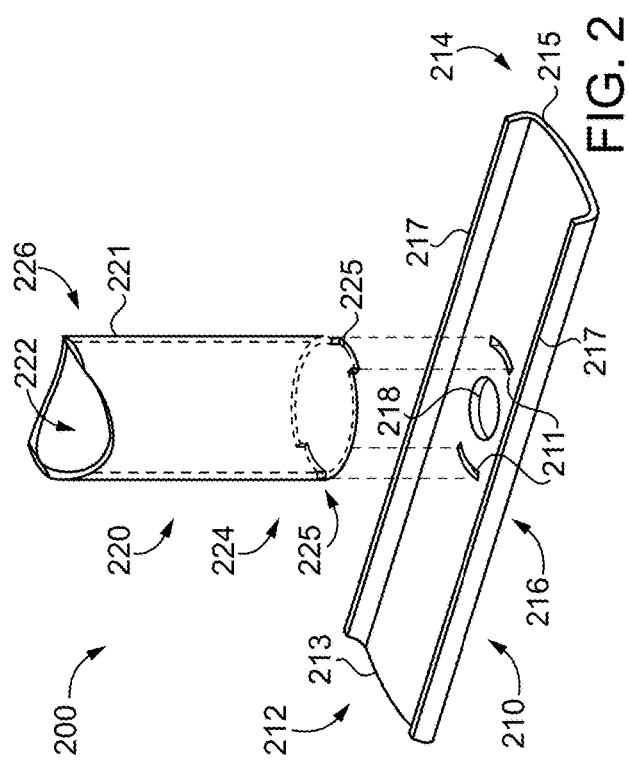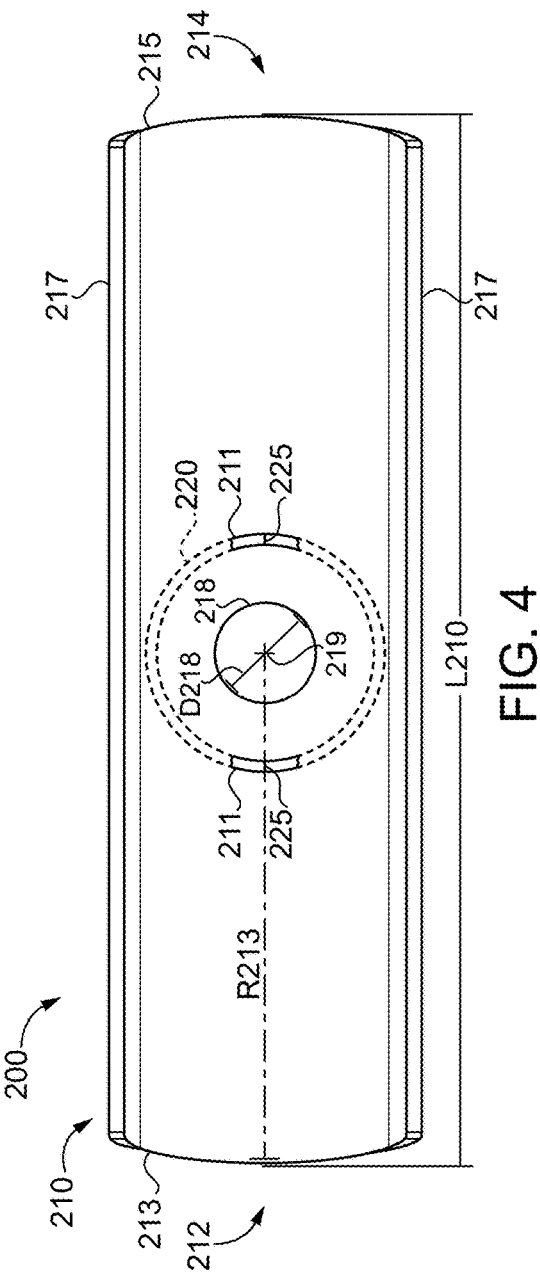

US 10,760,324 B2

MASONRY ANCHOR

TECHNICAL FIELD

The present disclosure generally relates to masonry anchors, and more particularly but not exclusively relates to masonry anchors for door and window frames.

BACKGROUND

When installing a door or window frame to an existing masonry opening, masonry anchors are frequently used to brace the frame against deformation. Certain conventional masonry anchors are provided as two-piece anchors including a flat rectangular plate and a U-shaped brace such as, for example, as illustrated in FIG. 7. Such anchors suffer from a variety of drawbacks and limitations, including those related to ease of installation and incompatibility with frames of different sizes. For these reasons among others, there remains a need for further improvements in this technological field.

SUMMARY

An exemplary masonry anchor includes a plate and a tube extending from the plate. The plate has a first end, an opposite second end, and a pair of edges extending between the first and second end. The tube is defined by a circumferential sidewall surrounding a central opening of the tube. The tube has a first end portion secured to the plate and an opposite second end portion. In certain embodiments, the first and second ends of the plate are curved. In certain embodiments, the second end portion of the tube includes a cutout operable to receive a dimple of a channel member. In other embodiments, one or both of the edges of the plate are bent in the direction in which the tube extends from the plate. Further embodiments, forms, features, and aspects of the present application shall become apparent from the description and figures provided herewith.

BRIEF DESCRIPTION OF THE FIGURES

FIG. 2 is an exploded assembly view of the masonry anchor.

FIG. 3 is a perspective illustration of the masonry anchor.

FIG. 4 is a plan view of the masonry anchor.

DETAILED DESCRIPTION OF ILLUSTRATIVE EMBODIMENTS

Figure 1:
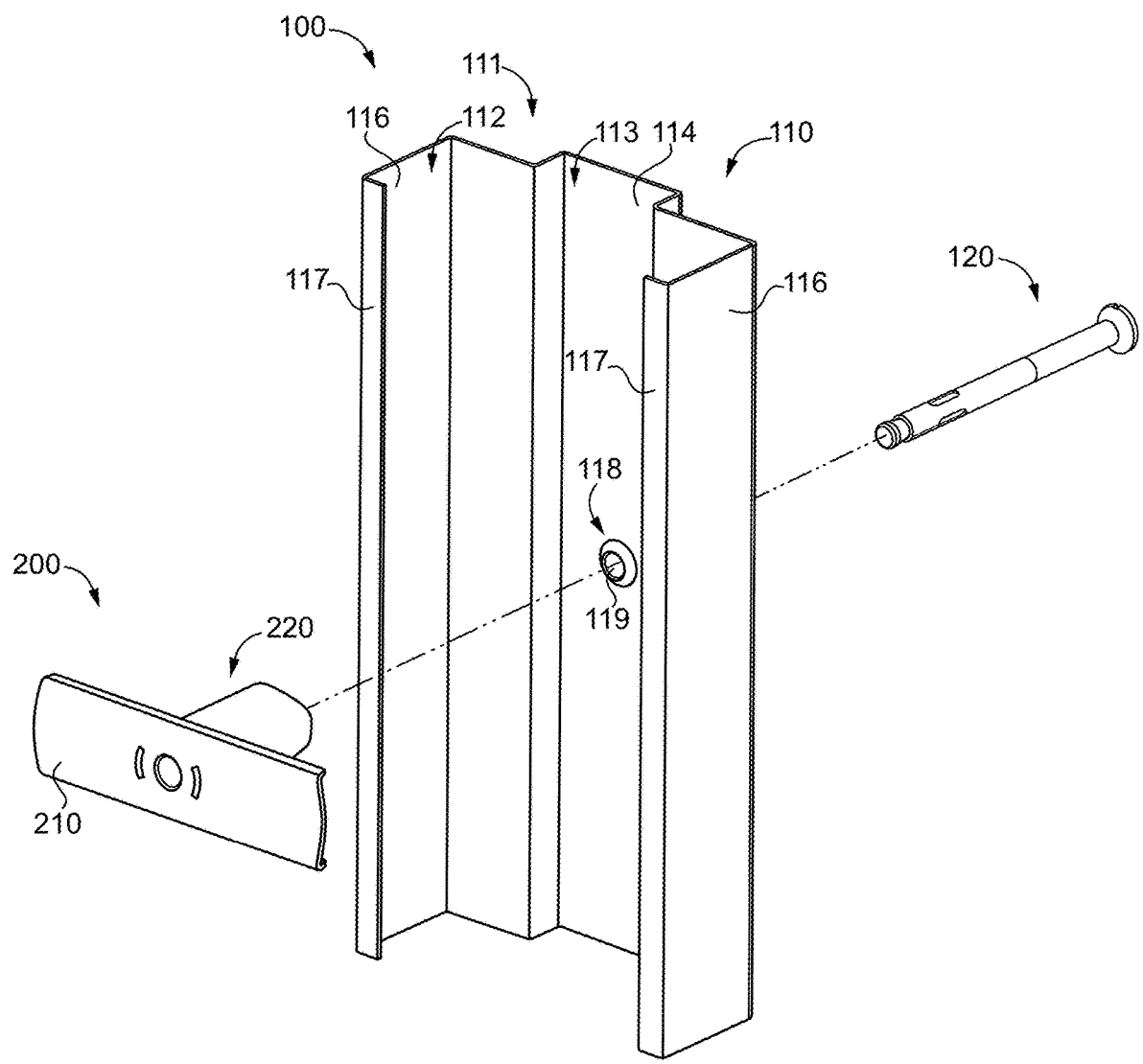
FIG. 1 is an exploded assembly view of a system including a channel member and a masonry anchor according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

With reference to FIG. 1, illustrated therein is a frame installation system 100 according to certain embodiments, which generally includes a channel member 110, a masonry bolt 120, and a masonry anchor 200 according to certain embodiments. As described herein, the masonry anchor 200 generally includes a plate 210 and a tube 220 extending from the plate 210, and is configured to facilitate installation of a frame to an existing masonry opening.

The channel member 110 defines a channel 111 that extends in a longitudinal direction (vertically in FIG. 1), and which includes a main channel portion 112 and a recessed channel portion 113. The channel member 110 includes a base portion 114 partially defining the recessed channel portion 113, a pair of sidewalls 116 partially defining the main channel portion 112, and a pair of back bends or flanges 117 that extend toward one another from the sidewalls 116 to partially enclose the channel 111. The base portion 114 includes a countersunk dimple 118 that extends into the recessed channel portion 113, and which includes an aperture 119 for receiving the bolt 120.

The masonry bolt 120 is a conventional masonry bolt, and generally includes a head 122 and a shank 124 extending from the head 122. The rear side of the head 122 is tapered such that the head 122 is operable to be received in the countersunk dimple 118. The shank 124 is configured to extend through the aperture 119 and the masonry anchor 200 to engage masonry 90 (FIG. 5) behind the channel member 110. In the illustrated form, the shank 124 includes a sleeve 126 that covers a pair of fingers 129 (FIG. 5) that splay radially outwardly when the end of the shank 124 has passed through the masonry 90 to secure the channel member 110 to the masonry 90.

With additional reference to FIGS. 2-4, the masonry anchor 200 generally includes a plate 210 and a tube 220 extending from the plate 210. As described herein, the masonry anchor 200 is configured to be seated in the channel 111, to be secured to the channel member 110, and to support the channel member 110 during and after installation of the channel member 110 to the masonry 90.

The plate 210 includes a first end 212, an opposite second end 214, a continuous elongated body 216 extending between the first and second ends 212, 214, and an opening 218 formed at a generally central location of the body 216. Each of the first end 212 and the second end 214 is curved such that each of the first end 212 and the second end 214 defines a corresponding and respective arc 213, 215. Each arc 213, 215 is centered about a corresponding and respective center point located within the outer perimeter of the plate 210. As a result, the ends 212, 214 do not define corners that may impede rotation of the plate 210 within the channel member 110. In certain forms, the first and second ends 212, 214 may define arcs of the same circle. For example, the arcs 213, 215 may be centered at the same centerpoint, which in the illustrated form is coincident with the centerpoint 219 of the opening 218 such that the arcs 213, 215 and the opening 218 are concentric. The plate 210 has a length L210, and the opening 218 has a diameter D218. In certain forms, the arcs 213, 215 that is less than or equal to one half the plate length L210. For example, the arc 213 may have a radius of curvature R213 that corresponds to one half the plate length L210.

The body 216 includes a pair of edges 217 that extend between the first and second ends 212, 214. In the illustrated form, each of the edges 217 is bent to extend in the same direction in which the tube 220 extends from the plate 210. In other embodiments, only one of the edges 217 is so bent. In further embodiments, neither edge 217 is bent such that the plate 210 is flat. The body 216 also defines a pair of curved alignment apertures 211 formed on opposite sides of the opening 218. As described herein, the alignment apertures 211 aid in aligning the tube 220 with the plate 210 during assembly.

The tube 220 extends along a longitudinal axis 201 of the masonry anchor 200, is defined by a circumferential sidewall 221 that surrounds a central opening 222 of the tube 220, and has a first end portion 224 and an opposite second end portion 226. The first end portion 224 is secured to the plate 210 about the opening 218 such that the opening 218 is open to the central opening 222 of the tube 220. In the illustrated form, the first end portion 224 includes a pair of alignment tabs 225 that are inserted into the alignment apertures 211 during assembly. The tube 220 is then secured to the plate 210 by any suitable means, such as epoxy or a tack weld 202. The second end portion 226 includes a pair of recesses or cutouts 226 in the circumferential sidewall 221. As described herein, the cutouts 226 are configured to receive the dimple 118 to facilitate installation of the masonry anchor 200 in the channel member 110.

Figure 5:
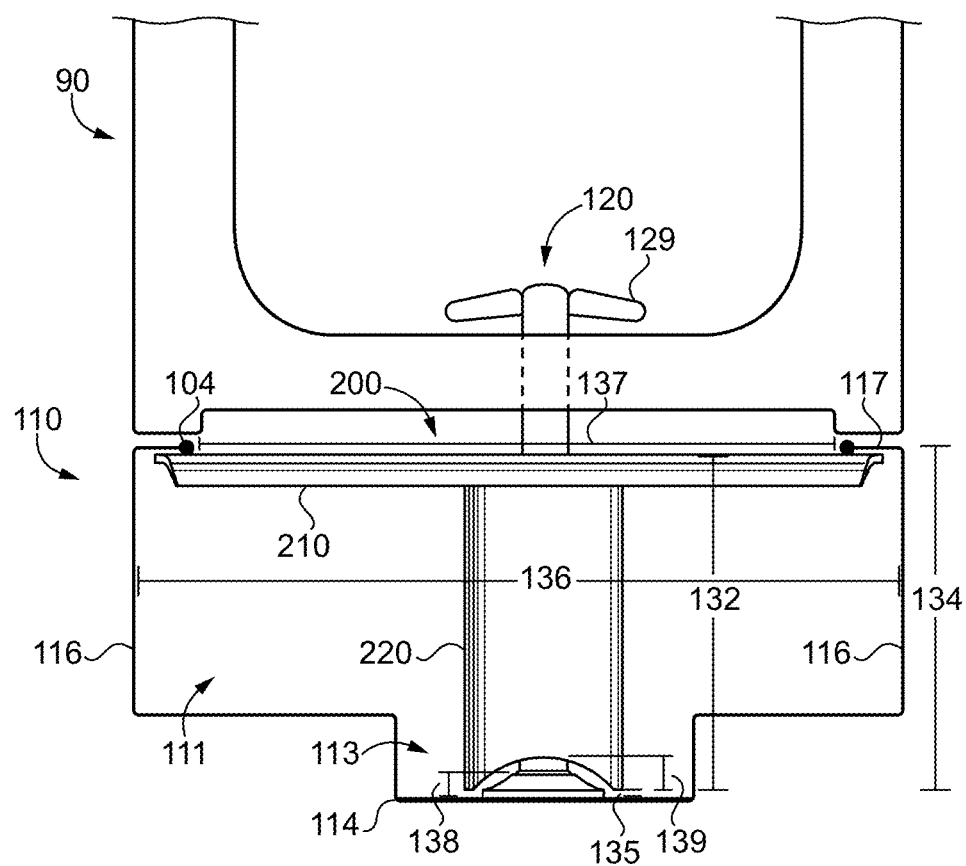
FIG. 5 is a plan view of the system installed to existing masonry.
Figure 6:
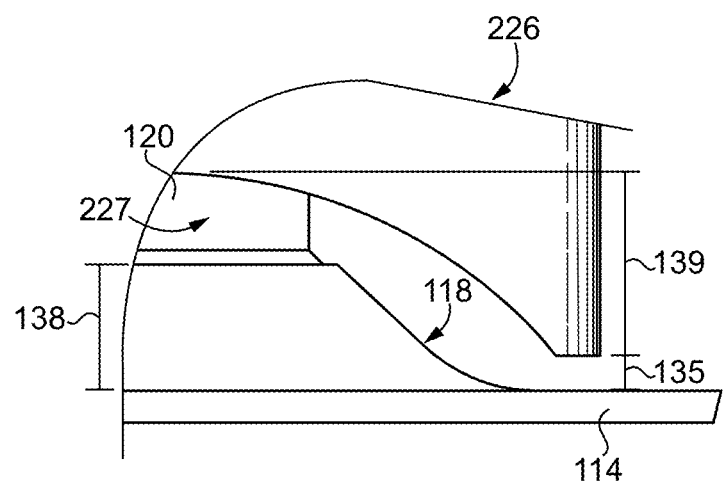
FIG. 6 illustrates a portion of the masonry anchor as installed to the channel member.

With additional reference to FIGS. 5 and 6, the installation system 100 has a plurality of dimensional characteristics 130. A height 132 of the masonry anchor 200 is defined as the distance between the outer face of the plate 210 and the outer face of the tube 220. A depth 134 of the channel 111 is defined between the inner face of the flange 117 and the inner face of the base portion 114. The masonry anchor height 132 is slightly less than the channel depth 134 such that a small clearance dimension 135 is defined between the base portion 114 and the end of the tube 220. An inner width 136 of the channel 111 is defined between the sidewalls 116, and an insertion width 137 of the channel 111 is defined between the flanges 117. The plate length L210 is less than the channel width 136 and greater than the insertion width 137. The dimple 118 has a dimple height 138, and the cutouts 227 have a cutout height 139 that corresponds to the dimple height 138 such that the cutouts 227 are capable of sliding over the dimple 118 when the second end portion 226 of the tube 220 is in contact with the base portion 114 of the channel member 110. Additionally, the length of the bolt 120 is sufficient to extend through the channel member 110 and into the masonry 90 during the installation process.

During installation of the system 100 to the masonry 90, the masonry anchor 200 is first inserted into the channel 111. This step may involve rotating the anchor 200 about its longitudinal axis 201 to a rotated position such that the plate 210 can be received within the insertion width 137, and subsequently rotating the anchor 200 about its longitudinal axis 201 to an aligned position such that the ends 212, 214 of the plate 210 are positioned adjacent the inward-facing sides of the back-bent flanges 117. This portion of the process is facilitated by the radiused ends 212, 214 of the plate 210, which do not include corners that would otherwise engage the sidewalls 116 and prevent such rotation of the anchor 200.

The insertion step also includes aligning the opening 218 with the dimple 118 such that the bolt shank 124 can be passed through the openings 218, 119. In certain embodiments, the insertion step may include aligning the opening 218 with the dimple 118 while the anchor 200 is in its rotated position, in which the plate 210 is rotationally offset relative to the insertion width 137. In other forms, the insertion step may involve rotating the anchor 200 to the aligned position (in which the plate 210 is aligned with the insertion width 137) prior to aligning the opening 218 with the dimple 118. In such forms, the plate 210 may slide along the flanges 117 and/or the end of the tube 220 may slide along the base portion 114. As the second end portion 226 moves along the recessed portion 113 of the channel 111, the dimple 118 passes through one of the cutouts 227 and into the central opening 222 of the tube 220, thereby aligning the dimple 118 with the plate opening 218.

Once the anchor 200 has been inserted to the channel member 110 in the manner described above, the plate 210 may be secured to the channel member 110, such as by welding. For example, welds 104 (FIG. 5) may be formed at each end of the plate 210 to secure the plate 210 to the flanges 117. With the anchor 200 secured to the channel member 110, the channel member 110 may be placed in abutment with the existing masonry 90. The shank 124 is then inserted through the aligned openings 119, 218 such that the end of the shank 124 engages the masonry 90. The bolt 120 is then advanced into the masonry 90, for example using an impact driver. As the bolt 120 advances, the channel member 110 may deform slightly such that base portion 114 contacts the second end portion 226 of the tube 220. When this occurs, the anchor 200 acts as a brace that prevents further deformation of the channel member 110, thereby maintaining both the aesthetics and the structural integrity of the channel member 110.

Figure 7:
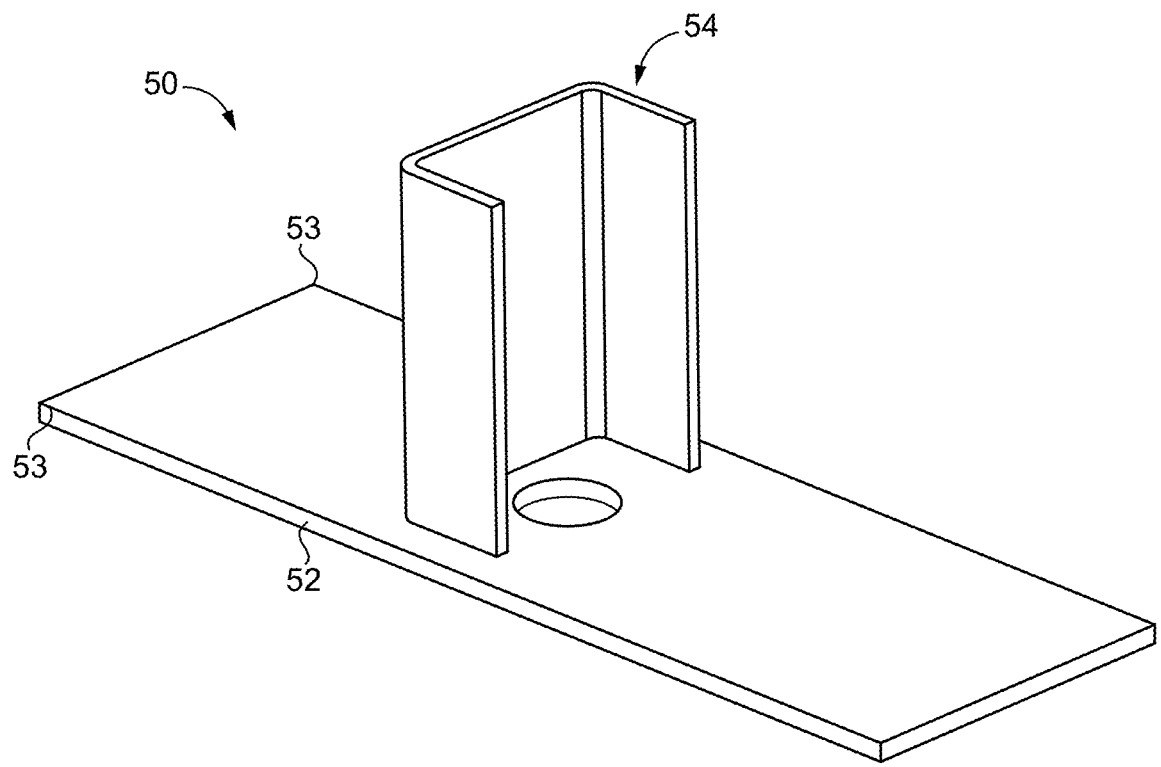
FIG. 7 is a perspective illustration of a prior art masonry anchor.

With reference to FIG. 7, illustrated therein is a prior art masonry anchor 50, which generally includes a flat rectangular plate 52 and a U-shaped brace 54. The conventional anchor 50 has several drawbacks and limitations, at least some of which may be cured by the masonry anchor 200 described herein. For example, the plate 52 has corners 53 that, when the plate is inserted into the channel member 110, engage the sidewalls 116 and prevent rotation of the plate 52. As such, the plate 52 has to be tilted in order to clear the insertion width 137 for insertion into the channel 111.

By contrast, the radiused ends 212, 214 of the anchor 200 allow for the anchor 200 to be inserted into the channel 111 and rotated in the manner described above, thereby eliminating the need for tilting of the plate. These features also facilitated use of the same anchor 200 in channel members 110 having varying channel widths 136. More particularly, it has been found that by appropriately selecting the various dimensions of the anchor 200, a single anchor 200 can be used in several industry-standard sizes of the channel member 110. As one example, the plate length L210 may be selected as five and three-eighths inches, and the radius of curvature for the plate ends 212, 214 may be selected as about one half the plate length L210. It has been found that such dimensional characteristics advantageously facilitate the use of the anchor 200 in up to four industry-standard sizes for the channel member 110.

Additionally, while the brace 54 must be positioned about the dimple 118, the brace 54 does not include cutouts that would allow the brace 54 to slide over the dimple 118. By contrast, the cutouts 227 allow the second end portion 226 to easily slide over the dimple, thereby facilitating the installation process.

The foregoing limitations of the conventional anchor 50 also contribute to another major drawback of the conventional anchor—the requirement that the anchor 50 be provided in two separate pieces. This requirement significantly increases the burden of installation, as each piece must be individually mounted to the channel member. In testing, it has been found that trained personnel installing the conventional anchor 50 can take as long as six minutes to install each anchor 50. With the inventive anchor 200, by contrast, this installation time can be cut down to as little as thirty seconds, thereby greatly increasing efficiency and reducing the time required to install the system 100 to the existing masonry 90.

A further drawback of the conventional anchor 50 relates to the strength of the anchor 50 during loading conditions. Testing has shown that under loads of 1000 pounds, a 12-gauge plate 52 of the conventional type can deflect by 1.5 inches or more, which may result in significant deformation of the channel member 110. In embodiments that include the bent edges 217, by contrast, this deformation can be significantly reduced. For example, using a 12-gauge plate 210 with a single bent edge 217 reduces deflection of the plate 210 to roughly 0.6 inches under 1000-pound load, while providing both edges 217 as bent can reduce deflection to below 0.5 inches. By increasing the height of the bent portions, the deflection can be reduced to roughly 0.2 inches.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A masonry anchor configured for use with a channel member, the masonry anchor comprising:
    a plate sized and shaped to fit within the channel member, the plate having a first end, an opposite second end, and a pair of edges extending between the first end and the second end, and wherein the plate defines a plate opening and a first aperture; and
    a tube extending from the plate, the tube comprising a circumferential wall surrounding a central opening of the tube, the tube having a first end portion and an opposite second end portion, wherein the first end portion is secured to the plate such that the plate opening is connected to the central opening of the tube;
    wherein the first end portion of the tube further includes a first projection received in the first aperture.

2. The masonry anchor of claim 1, wherein the plate further defines a second aperture, and wherein the first end portion of the tube further includes a second projection received in the second aperture.

3. A masonry anchor configured for use with a channel member of a frame, the masonry anchor comprising:
    a plate sized and shaped to fit within the channel member, the plate having a first end, an opposite second end, and a pair of edges extending between the first end and the second end, and wherein the plate defines a plate opening, and wherein each of the first end and the second end is curved about a corresponding and respective center point; and
    a tube extending from the plate, the tube comprising a circumferential wall surrounding a central opening of the tube, the tube having a first end portion and an opposite second end portion, and wherein the first end portion is secured to the plate such that the plate opening is connected to the central opening of the tube;
    wherein each center point is located within an outer perimeter of the plate; and
    wherein each center point is located within the plate opening.

4. The masonry anchor of claim 3, wherein the second end portion of the tube includes a cutout in the circumferential wall; and
    wherein the cutout defines a recess connected with the central opening.

5. The masonry anchor of claim 3, wherein each of the first end and the second end has a corresponding and respective radius of curvature; and
    wherein each radius of curvature is less than or equal to one half a length of the plate.

6. The masonry anchor of claim 3, wherein each edge is bent in a direction in which the tube extends from the plate such that the plate defines a trough, and wherein the first end portion is positioned within the trough.

7. A masonry anchor configured for use with a channel member having a dimple, the masonry anchor comprising:
a plate sized and shaped to fit within the channel member, the plate having a first end, an opposite second end, and a pair of edges extending between the first end and the second end, and wherein the plate defines a plate opening; and
a tube extending from the plate, the tube comprising a circumferential wall surrounding a central opening of the tube, the tube having a first end portion and an opposite second end portion, wherein the first end portion is secured to the plate such that the plate opening is connected to the central opening of the tube, and wherein the second end portion includes a cutout in the circumferential wall, the cutout defining a recess connected with the central opening;
wherein the plate further includes an aperture; and
wherein the first end portion of the tube includes a projection received in the aperture.

8. The masonry anchor of claim 7, wherein the recess is sized and shaped to receive the dimple.

9. The masonry anchor of claim 7, wherein at least one edge of the pair of edges is bent in a direction in which the tube extends from the plate such that the at least one edge defines a lip extending a length of the at least one edge.

10. The masonry anchor of claim 7, wherein each edge of the pair of edges is bent in the direction in which the tube extends from the plate such that the plate defines a trough in which the first end portion of the tube is received.

11. The masonry anchor of claim 7, wherein the plate further includes a second aperture, and wherein the first end portion of the tube includes a second projection received in the second aperture.

12. A frame installation system including:
the masonry anchor of claim 7 and the channel member;
wherein the dimple is a countersunk dimple configured to receive a masonry bolt; and
wherein the plate opening is sized and shaped such that the masonry bolt is operable to pass through the plate opening.

13. A method of using the masonry anchor of claim 7 with the channel member, the method comprising:
installing the channel member to an existing masonry opening of the masonry anchor, wherein the dimple projects from a base of the channel member into a channel of the channel member, and wherein the channel member further includes a pair of flanges that extend toward one another and partially enclose the channel, the installing comprising:
inserting the masonry anchor into the channel of the channel member, the inserting comprising:
placing the masonry anchor within the channel such that the dimple is received in the second end portion of the tube; and
rotating the masonry anchor such that ends of the plate are positioned adjacent the flanges; and
securing the masonry anchor to the channel member by securing the ends of the plate to the flanges.

14. The method of claim 13, wherein the channel member further comprises a pair of sidewalls from which the flanges extend;
wherein the channel member has a channel width defined between the pair of sidewalls and an insertion width defined between the pair of flanges; and
wherein a maximum dimension of the plate is less than the channel width and greater than the insertion width.

15. The method of claim 13, further comprising:
inserting a bolt through the dimple, the tube, and the plate opening; and
engaging the bolt with masonry behind the plate to secure the channel member to the masonry.

16. The method of claim 13, wherein placing the masonry anchor within the channel such that the dimple is received in the second end portion of the tube comprises sliding the second end portion within a recessed portion of the channel such that the dimple passes through the cutout in the circumferential wall of the tube.

17. The method of claim 16, wherein the cutout has a cutout height, wherein the dimple has a dimple height, and wherein the cutout height is greater than the dimple height.

18. The method of claim 13, wherein the ends of the plate are curved to facilitate rotation of the masonry anchor about a longitudinal axis of the tube.

19. The method of claim 18, wherein each end of the plate is curved about a corresponding and respective center point; and
wherein each center point lies within an outer perimeter of the plate.

20. The method of claim 18, wherein each end of the plate defines an arc having a corresponding and respective radius of curvature; and
wherein each radius of curvature is less than or equal to one half of a length of the plate.

* * * * *